United States Patent

Park et al.

[11] Patent Number: 6,149,435
[45] Date of Patent: Nov. 21, 2000

[54] SIMULATION METHOD OF A RADIO-CONTROLLED MODEL AIRPLANE AND ITS SYSTEM

[75] Inventors: Chan Jong Park; Jin Sung Choi; Man Kyu Sung; Ji Hyung Lee, all of Taejon; Sang Won Kim, Cheju; Dong Hyun Kim; Jung Kak Kim, both of Taejon; Chan Su Lee, Euijungbu, all of Rep. of Korea

[73] Assignee: Electronics and Telecommunications Research Institute, Daejeon, Rep. of Korea

[21] Appl. No.: 09/220,422

[22] Filed: Dec. 24, 1998

[30] Foreign Application Priority Data

Dec. 26, 1997 [KR] Rep. of Korea ............... 97-74666

[51] Int. Cl.⁷ .................. G09B 19/16; G09B 9/08
[52] U.S. Cl. ............ 434/30; 434/32; 434/33
[58] Field of Search ............ 434/28–29, 30, 434/32, 33, 35, 38, 43, 44, 48, 49, 51

[56] References Cited

U.S. PATENT DOCUMENTS

| | | | |
|---|---|---|---|
| 4,120,099 | 10/1978 | Fett | 434/32 |
| 5,320,538 | 6/1994 | Baum | 434/307 |
| 5,566,241 | 10/1996 | Lewis et al. | 381/113 |
| 5,807,114 | 9/1998 | Hodges et al. | 434/236 |

*Primary Examiner*—Jacob K. Ackun
*Assistant Examiner*—John Edmund Rovnak
*Attorney, Agent, or Firm*—Cohen, Pontani, Lieberman & Pavane

[57] ABSTRACT

The present invention is related to a system which is portable and attache the body of a trainee so that the trainee can practice navigating of a model airplane at an arbitrary location, contrary to the system of a large-sized airplane. According to an object of the present invention there is provided a trainee navigates a model airplane virtually by simulating a model airplane using a computer by combining the three-dimensional virtual image of a model airplane and the actual image of the training site by a computer. The simulation method of a radio-controlled model airplane of the present invention is comprising the steps of recording various airplane models into the computer system; simulating the airplane model by processing signals received from the controller; producing images by rendering the results of signal processing of the simulation step; showing images which are to appear in two eyes of the user at both indicators of HMD(head-mounted display) or STHMD(see-through head-mounted display) in order to convert produced images to be three-dimensional; and producing the unique sound of the corresponding airplane model in three dimensions and listening the sound to the headphone of HMD or STHMD.

5 Claims, 2 Drawing Sheets

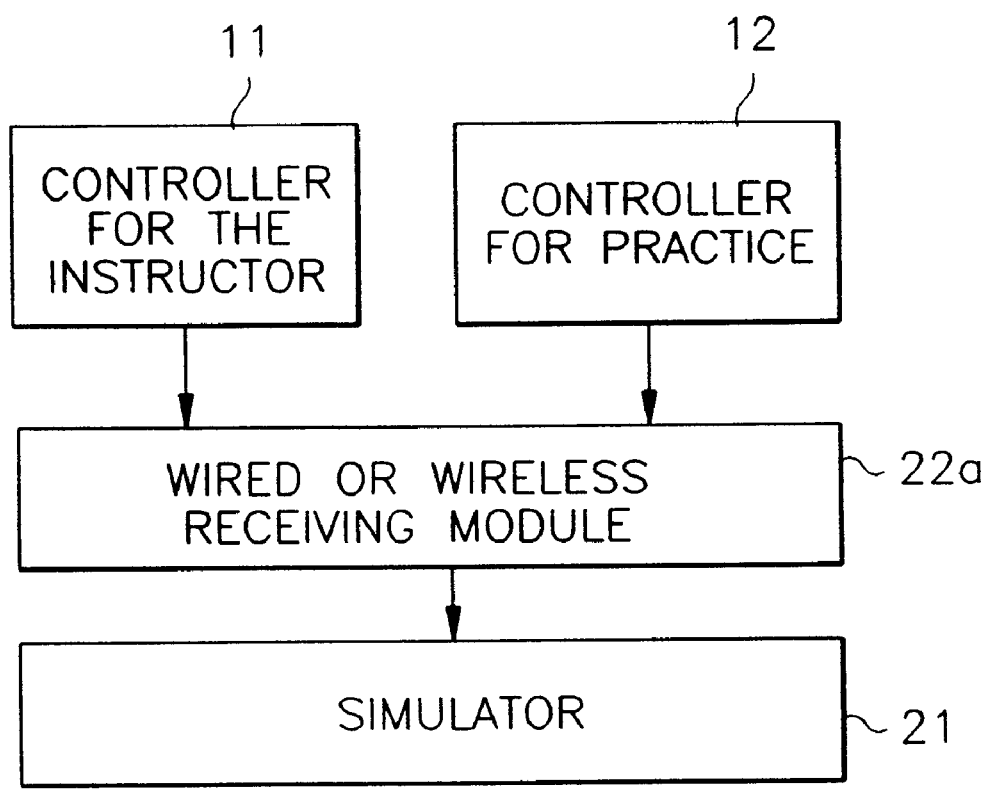

SIMULATION METHOD OF A RADIO-CONTROLLED MODEL AIRPLANE AND ITS SYSTEM

BACKGROUND OF THE INVENTION

1. Field of the Invention

The present invention is related to the simulation system of a radio-controlled model airplane using the virtual reality technology, particularly, to the system which is portable and attached to the body of a trainee so that the trainee can practice navigating of a model airplane at an arbitrary location, contrary to the system of a large-sized airplane.

2. Description of the Prior Art

Conventionally, a trainee had to practice by actually flying a model airplane in order to obtain training for navigating a radio-controlled model airplane. However, this method of training has been disadvantageous in that preparation for the training is too complicated, there are many restrictions in connection with a place to get training, and equipment is easily damaged due to accidents during navigating.

SUMMARY OF THE INVENTION

It is therefore an object of the present invention to provide a trainee to navigate a model airplane virtually by simulating a model airplane using a computer by combining the three-dimensional virtual image of a model airplane and the actual image of the training site by a computer.

The first aspect of the present invention relates to the simulation method of a radio-controlled model airplane comprising the steps of recording various airplane models into the computer system; simulating the airplane model by processing signals received from the controller; producing images by rendering the results of signal processing of the simulation step; showing images which are to appear in two eyes of the user at both indicators of HMD(head-mounted display) or STHMD(see-through head-mounted display) in order to convert produced images to be three-dimensional; and producing the unique sound of the corresponding airplane model in three dimensions and listening the sound from the headphone of HMD or STHMD. (Hereinafter, HMD or STHMD is referred to as HMD commonly.)

The second aspect of the present invention relates to the simulation method of a radio-controlled model airplane of first aspect,wherein the rendering step includes displaying results of simulation differently according to the visual sight and angle which vary as the head of the user moves when a three-dimensional position and direction tracker is attached to HMD which is to be worn by the user.

The third aspect of the present invention relates to the simulation method of a radio-controlled model airplane comprising of the steps of storing the airplane model and the simulation program into the simulation computer; interfacing manipulation signals in order to input manipulation signals of the controller in the computer; simulating the airplane model by rendering according to manipulation signals of the controller; outputting the results of simulation to HMD and displaying the virtual image of the three-dimensional model airplane to be overlapped with the actual image; and controlling simulation by measuring the position of the user and the sight direction of HMD, measuring the distance from an object in terms of the focal distance by photographing the actual image with a stereo camera, and detecting collision between the virtual image of the model airplane and the actual object.

The fourth aspect of the present invention relates to the simulation method of a radio-controlled model airplane of the third aspect,wherein the step of controlling simulation comprising a step for controlling by grasping the position of the user according to information on the position which is received by GPS receiver, computing the relative position of a model airplane which is simulated according to this positional information, detecting collision with the virtual image by finding out the distance from the user to the object according to the focal distance of the actual image which is obtained through the stereo camera, and further detecting that collision.

The fifth aspect of the present invention relates to the simulation system of a radio-controlled model airplane comprising a GPS receiver obtaining the positional information of the user; a position and detection tracking means tracking the sight direction of the user; a controller for manipulating the airplane model; a portable simulation computer storing the airplane model, detecting collision between the airplane model and the actual object according to the position and sight direction of the user and the actual image which are obtained through the GPS receiver, position and direction tracking means, and stereo camera; and simulating the airplane model according to navigate signals which are inputted from the controller; HMD displaying virtual images which are simulated by the simulation computer as three-dimensional images and combining them with actual images; and a stereo camera photographing actual images according to the sight direction of HMD. The simulation system of a radio-controlled model airplane still further includes a wired or wireless receiving module which receives navigate signals of the controller and interfaces them into the simulation computer.

The sixth aspect of the present invention relates to the simulation system of a radio-controlled model airplane of the fifth aspect, the controller of the system includes a controller for the instructor enabling him/her to navigate the model airplane and a controller for practice enabling a trainee to navigate the model airplane. The wired or wireless receiving module in the system is composed in such a way of receiving input of the controller for the instructor automatically if the instructor generates input of the radio controller as necessary for the purpose of training while receiving input of the controller for practice, or of receiving input of the controller for practice if there is no change in the input signal of the controller for the instructor even after a fixed amount of time.

In summary, the main technical aspects of the present invention are the simulation of an airplane model controlled by the user in real time, visualization of the model into HMD which is a display used by the user, and combining the visualized movement of the model airplane and the actual object viewed by the user graphically. Accordingly, the present invention is comprised of four steps of receiving input signals of the controller which enter into the computer performing simulation firstly, simulating the airplane model which is in the computer, visualizing the simulation results, and controlling the above simulation process by tracking the position and sight direction of the user.

In the first step, it is necessary to know the technology of inputting signals of the controller into the computer. It is necessary to convert output of the existing radio controller into the signals which are proper for the computer, and the outcome should be applicable to the corresponding model which is recorded inside of the model according to various characteristics of the controller. Since most controllers are designed to enable wired or wireless communication, a controller may be connected directly in terms of wires in case of utilizing a portable computer, provided that signals received by the computer have to be converted into digital signals taking into consideration of the corresponding characteristics.

In the second step, it is necessary to perform computer simulation in which signals of the controller received by the computer are applied to the computer model and changed to be in the model state. During this process, it is necessary to know the technology of manipulating the model according to signals received by the computer and applying the result of manipulation to the signals at the speed which is proper for characteristics of each model. Therefore, the user should be able to set and control many variables in order to show many characteristics of the model airplane as they are so that more realistic simulation is enabled.

The third step is the process of visualizing the results of simulation. It is necessary to know the technology of enabling to have more sense of perspective and real feeling by converting them into three dimensions and showing them in front of two eyes of the user rather than simply displaying as computer images.

In the fourth step, the simulation computer grasps the position of the user according to the positional information received by GPS receiver, and computes the relative position between this position and the position of the airplane model being simulated. The simulation computer also computes the distance to the object according to the actual image which is photographed through the stereo camera, and controls simulation by detecting collision of virtual image of the airplane model according to the distance to that actual object.

BRIEF DESCRIPTION OF THE DRAWINGS

The foregoing and other objects, aspects, and advantages will be better understood from the following detailed description of a preferred embodiment of the invention with reference to the drawings, in which:

FIG. 2 is a constructional diagram of a signal-processing module of the present invention.

DETAILED DESCRIPTION OF THE INVENTION

Figure 1:
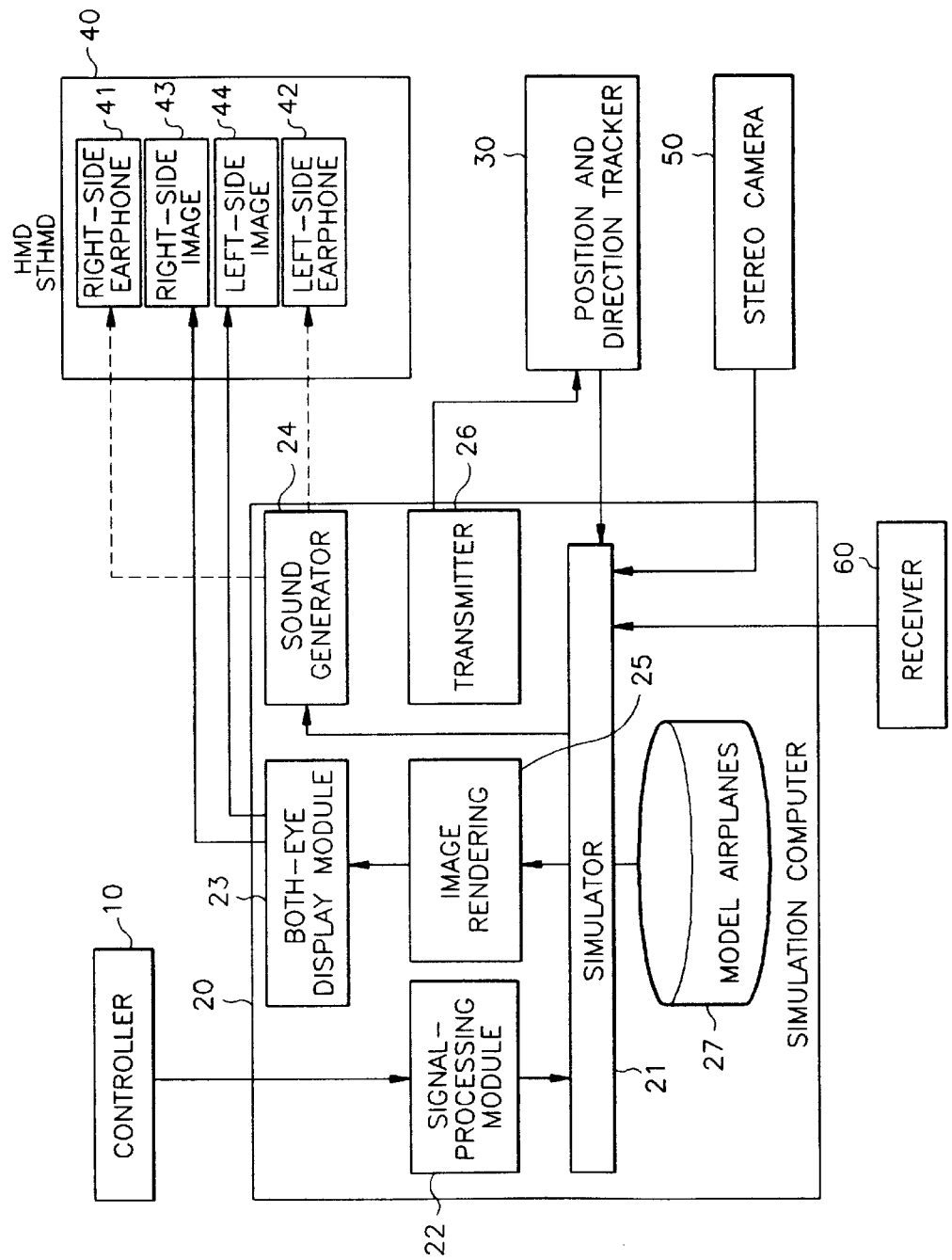
FIG. 1 is a constructional diagram of the entire system of the present invention.

Referring now to the drawings, and more particularly to FIG. 1, there is shown a method of simulating a radio-controlled model airplane.

FIG. 1 shows a constructional diagram of the entire system of the present invention, where reference numerals 10 is the controller, 20 is the simulation host computer, and 21 is the simulator. Reference numerals 22 is the signal-processing module, 23 is the two-eye display module, and 24 is the three-dimensional sound generator. And reference numerals 25 is the image rendering module, 26 is the transmitter, 30 is the position and direction tracker, and 40 is HMD. Further, reference numerals 41 and 42 are the right-side and left-side earphones, respectively, and 43 and 44 are displays for the right-side and left-side images, respectively again. Still further, reference numerals 50 is the stereo camera, and 60 is GPS receiver.

The simulation system of a radio-controlled model airplane is divided into the controller (10), simulation host computer (20), three-dimensional position and direction tracker (30), GPS receiver (60), HMD (40), and stereo camera (50). The controller (10) is connected to the computer in terms of wires or wirelessly. Since the system is designed to connect the controller for the instructor (not shown) and that for the trainee (not shown either) simultaneously, the instructor and trainee can perform the identical simulation at the same time. The host simulation computer (20) may be composed of a portable computer, or may be fixed to the set position of a medium- or large-sized computer as necessary. The simulation host computer (20) can also give a real feeling of navigating the actual model airplane by generating stereophonic sound. HMD (40) positions LCD or semi-transparent lens in front of eyes of the user so that the user can see actual surrounding environment through it. At the same time, HMD (40) overlaps the actual surrounding environment and the image of the model airplane by displaying the image of the model airplane produced by the computer on LCD or semi-transparent lens which is located in front of eyes of the user. The overlapped images then can create a three-dimensional feeling by showing different images according to the visual points of both eyes and difference in visual angle. The GPS receiver (60) makes measurement of the position of the user, while the three-dimensional position and direction tracker (30) is driven by the transmitter (26) and measures the visual point, sight direction, and other features of the user. HMD (40) indicates the results of simulation differently according to the position and sight direction of the user by attaching the GPS receiver (60) and three-dimensional position and direction tracker (30) to HMD (40).

The positional information of a building or any other object may be found out from the actual image by computing the distance to the object in that actual image in real time from the position of the user according to the focal distance by obtaining the actual image through the stereo camera (50) which is attached to HMD (40). A CCD camera may be used for the stereo camera (50). And collision of a building, land, or any other upperground object with the model airplane may be detected by calculating the current position, speed, direction, etc. of the airplane model with respect to the position of such object. Another way of obtaining the positional information of the above object is to use the geographical information such as data used for the navigation system of a vehicle, etc. for the portable computer and to calculate the position of the building from that geographical information. Further, in the present invention, one simulation space may be computer in advance by combining GPS data and geographical information, not simply by using the geographical information only. Therefore, the present invention can bring the same effects as navigating the model airplane directly on-site by combining the real-time movement of the model airplane and the actual image immediately during the actual simulation process.

FIG. 2 shows a constructional diagram of a signal-processing module of the present invention, where reference numerals 11 is the controller for the instructor, 12 is the controller for practice, and 22*a* is the wired or wireless receiving module.

The signal-processing module is composed of wired or wireless receiving module (22*a*). The wired or wireless receiving module (22*a*) is designed to process inputs of the controller for the instructor (11) and the controller for practice (12) simultaneously. Basically, the airplane model is simulated according to input signals of the controller for practice (12). If the instructor generates input of the radio controller, for the purpose of training as necessary, the input of the controller for the instructor (11) is automatically converted and processed, whereas, if there is no change in the input signal of the controller for the instructor (11) even after a fixed amount of time, the system is converted to receive input of the controller for practice (12).

The present invention has the same effects as the simulation system of a general large-sized airplane has. Therefore, the present invention is effective in that it is possible to navigate a radio-controlled airplane in the shortest possible time spending the minimum expenses; and it is possible to gain a great deal of experiences within a short time without trials and errors which have been made by people having navigating of a radio-controlled airplane as a hobby since there is no requirement for the place of navigating or no danger of damaging the equipment.

The present invention is also advantageous in that it can be made to enable its carrying at a low price. Therefore, another effect of the present invention is that, if it is made to be for military purpose, it may be utilized as a system of patrolling the action area while riding in the cockpit of a small radio-controlled airplane by attaching a camera to the airplane, generating images during the flight, and receiving and displaying these images on HMD.

The present invention is therefore related to a technology of sending input of the controller manipulating the radio-controlled model airplane to the computer, not to the model airplane; applying the input to the airplane model of the computer; sending the results of simulation by the computer to HMD worn by the user on his/her head; and thus making feel as if the model airplane were actually being navigated.

While the invention has been described in terms of a single preferred embodiment, those skilled in the art will recognize that the invention can be practiced with modification within the spirit and scope of the appended claims.

What is claimed is:

1. A method of simulating a radio-controlled model airplane comprising the steps of:

storing a simulation program for a model airplane in a simulation host computer;

interfacing a manipulation signal of a controller in order to input said manipulation signal to said simulation host computer;

simulating said model airplane by rendering according to said manipulation signal of said controller;

outputting the results of simulation to a HMD, overlapping a three-dimensional virtual image of said model airplane with an actual image, and displaying overlapped images; and controlling simulation by measuring the position of a user and the sight direction of said HMD, measuring the distance of an actual object according to the focal distance obtained by photographing said object actual image with a stereo camera, and detecting collision of said three-dimensional virtual image of said model airplane with said object.

2. The method of simulating a radio-controlled model airplane of claim 1 characterized by that, in controlling simulation:

the position of the user is grasped according to the positional information received by a GPS receiver;

the relative position of said model airplane being simulated is computed according to the positional information;

collision of said three-dimensional virtual image is detected by obtaining the distance from the user to said actual object according to the focal distance of said actual image obtained by said stereo camera; and simulation is controlled according to the collision.

3. A simulation system of a radio-controlled model airplane comprising:

a GPS receiver for obtaining a position of a user;

a position and direction tracking means for tracking a sight direction of the user;

a controller for navigating said model airplane;

a stereo camera for photographing an actual object image;

a portable simulation computer for storing a simulation of said model airplane, detecting collision of said model airplane and said actual object by analyzing said position of the user, said sight direction of the user, and said actual image, and simulating said model airplane according to a control signal inputted from said controller; and an HMD for displaying a virtual image simulated by said portable simulation computer as a three-dimensional image and combining said virtual image with said actual image.

4. The simulation system of a radio-controlled model airplane of claim 3 further comprising a wired or wireless receiving module for receiving said control signal of said controller and interfacing said control signal into said portable simulation computer.

5. The simulation system of a radio-controlled model airplane of claim 4 characterized by that:

said controller is comprised of a first controller for an instructor enabling the instructor to navigate said model airplane and a second controller for practice enabling a trainee to navigate said model airplane; and said wired or wireless receiving module is designed to receive input of said first controller for the instructor automatically if the instructor generates input of said first controller for the purpose of training as necessary while receiving input of said second controller for practice, or to receive input of said second controller for practice if there is no change in an input signal of said first controller for the instructor after a fixed amount of time.

* * * * *